Figure 1:
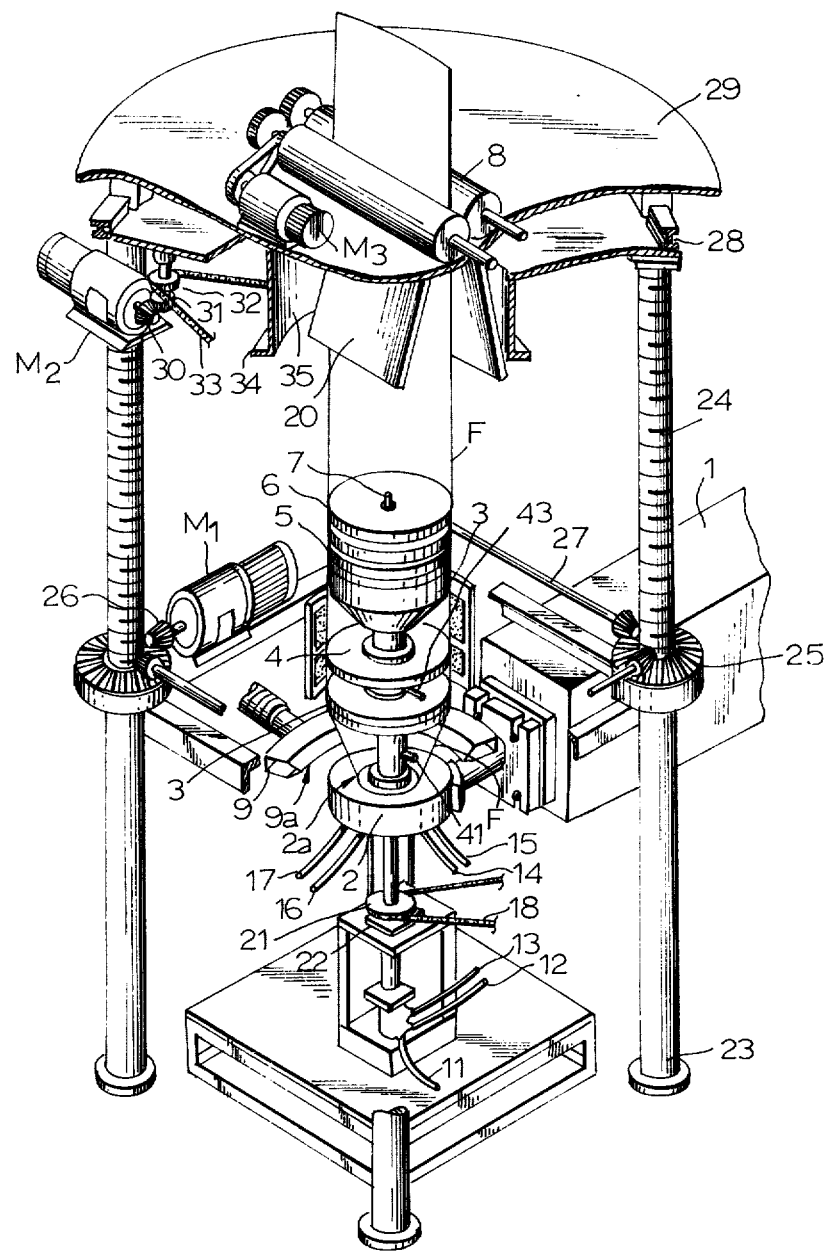

United States Patent
Ninomiya et al.

[11] 3,891,374
[45] June 24, 1975

[54] APPARATUS FOR IMPARTING AN OBLIQUE ORIENTATION TO TUBULAR FILM

[75] Inventors: Tomokazu Ninomiya, Iwakuni; Nobuhiro Hirata, Otake, both of Japan

[73] Assignee: Mitsui Petrochemical Industry Ltd., Tokyo, Japan

[22] Filed: Mar. 27, 1973

[21] Appl. No.: 345,369

[30] Foreign Application Priority Data
Mar. 31, 1972  Japan................................ 47-32228

[52] U.S. Cl................... 425/326 R; 264/89; 264/95; 264/209; 425/94; 425/387 R; 425/388; 425/393
[51] Int. Cl............................................ B29d 23/04
[58] Field of Search......... 264/89, 95, 209, 90, 237, 264/92; 425/131, 94, 133.1, 325, 326 B, 387 B, 388, 391, 392, 393, 326 R, 387 R, 378, 379

[56] References Cited
UNITED STATES PATENTS

| | | | |
|---|---|---|---|
| 3,092,874 | 6/1963 | Fallwell | 264/95 X |
| 3,142,092 | 7/1964 | Ralston | 264/95 X |
| 3,160,917 | 12/1964 | Berggren et al. | 425/393 X |
| 3,354,506 | 11/1967 | Raley | 425/133 |
| 3,635,634 | 1/1972 | Nagano et al. | 425/325 |

*Primary Examiner*—R. Spencer Annear
*Assistant Examiner*—Mark Rosenbaum
*Attorney, Agent, or Firm*—Sherman & Shalloway

[57] ABSTRACT

An obliquely oriented tubular film is produced by using an apparatus which includes a first zone where a tubular film of a thermoplastic resin is extruded from an annular die and then cooled, a second zone comprising a fixed mandrel, a rotating mandrel and heating means where the tubular film is heated to its orienting temperature and given torsion between the fixed and rotating mandrel which are mounted coaxially thereby to orient the film obliquely, and a third zone comprising a pair of nip rollers which pull out the oriented tubular film while rotating synchronously and concentrically with the rotating mandrel.

2 Claims, 2 Drawing Figures

3,891,374

APPARATUS FOR IMPARTING AN OBLIQUE ORIENTATION TO TUBULAR FILM

This invention relates to a method and an apparatus for imparting an oblique orientation to a tubular film of a thermoplastic resin fabricated using an annular die.

The prior art apparatus for producing tubular films includes an annular die at its lower part for extruding a molten thermoplastic resin, a pair of nip rollers at its upper part for withdrawing the resulting tubular film, and a mandrel therebetween for expanding the tubular film to the desired size. The film as extruded from the annular die is in the molten or nearly molten state and has very good stretchability. Therefore, when pressurized air, for example, is supplied into the interior of the film, it easily expands to the desired size. The film which is initially in the molten state is gradually cooled as it is expanded and advanced, whereby the film is solidified and maintains its tubular form. A pulling action is assuredly transmitted, and the tubular film is continuously withdrawn. Some of such tubular films are monoaxially oriented during such a processing operation. The monoaxially oriented tubular films have high tensile strength in a direction same as the stretching direction, but low strength in a direction at right angles thereto. It is generally known that this is due to the direction of orientation of molecules. In an attempt to remove this defect, consideration has been given to imparting orientation to films in an oblique direction, and laminating the obliquely oriented films, for example, as shown in British Patent Specification No. 1,071,085 (granted E. I. du Pont de Nemours & Co.). When helical cut having a certain width is provided in the monoaxially oriented tubular film, a ribbon-like film results. Evidently, this ribbon-like film is in the obliquely oriented state. This method, however, has the defect that the resulting film is ribbon-like and limited in use, and it is necessary to cut the tubular film in an oblique direction during its manufacturing step. With a view to remedying this defect, the inventors of the present invention first thought that by maintaining the annular die in the fixed state and rotating the mandrel and a film withdraw device synchronously and concentrically, the tubular film could be stretched with torsion between the annular die and the mandrel to impart an oblique orientation to it. It was found however that this concept cannot be materialized with good results. The tubular film located between the annular die and the rotating mandrel is somewhat solidified in the vicinity of the mandrel and is in the molten or nearly molten state immediately after extrusion from the annular die to permit free deformation by an external force. Accordingly, when the tubular film is subject to distorting tension as mentioned above, the molten part first deforms but the other part deforms very slightly. When the film is in the molten state, the application of tension thereto in an oblique direction does not result in molecular orientation. Accordingly, in the above mode of practice, it is impossible to impart molecular orientation in an oblique direction.

In contrast, the following measures are taken in the present invention. First, both the annular die and the mandrel are provided in the fixed state, and a tubular film is formed between them. The resulting film is cooled and solidified. In a second step, a rotary mandrel is provided ahead of the fixed mandrel spaced from it by a certain distance, and by rotating the mandrel, torsion is given to the tubular film between the mandrels. At this time, it is necessary to reheat the tubular film so as to render it stretchable. Thus, an oblique molecular orientation can be imparted to the film.

Accordingly, it is an object of this invention to provide a method and an apparatus for producing a tubular film of high strength by imparting a specified oblique orientation to the tubular film during its production.

Figure 2:
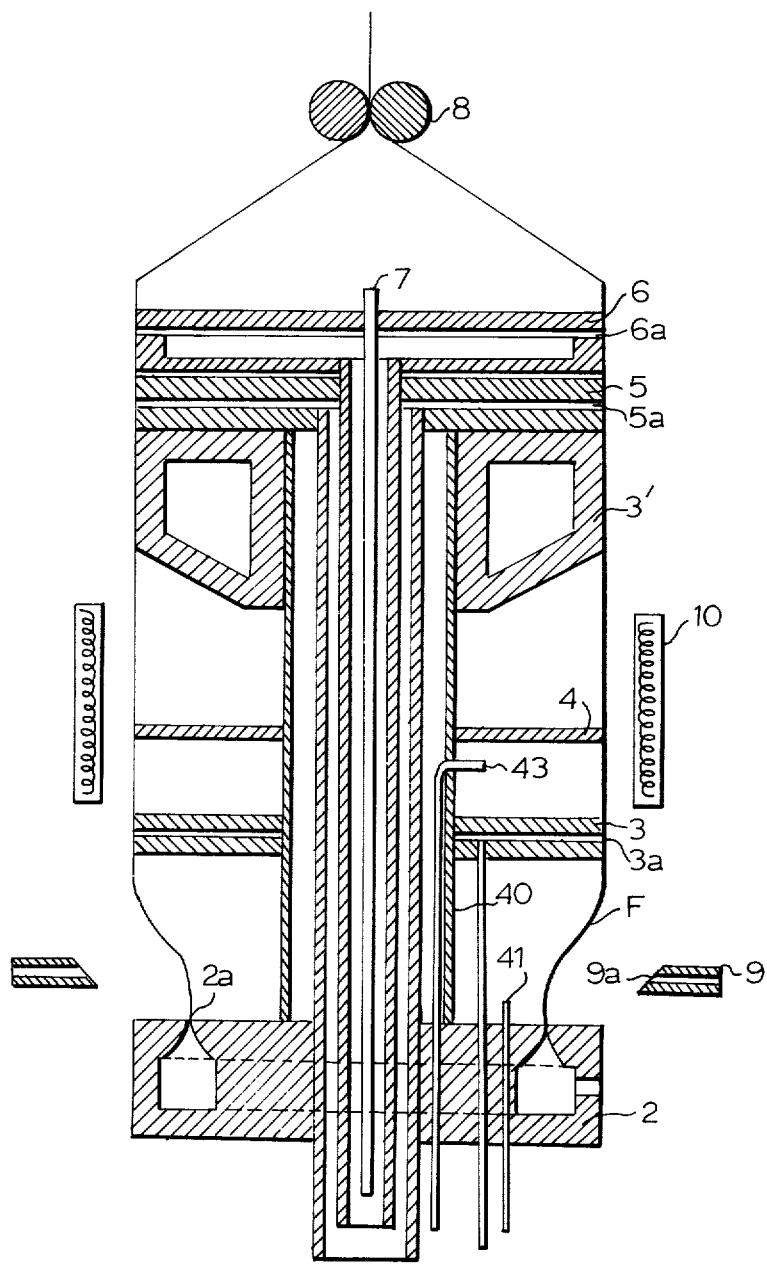

The invention will be described in greater detail by reference to the accompanying drawings in which:

FIG. 1 is a perspective view of the apparatus of this invention partly broken away; and FIG. 2 is a side elevation in longitudinal section of a principal film-forming part of the apparatus.

Referring to FIG. 1, a first part of the film-forming apparatus used in this invention comprises an extruder 1 for extruding a molten thermoplastic resin, an annular die 2 for receiving the extruded molten resin, an annular slit 2a provided on the annular die 2 for forming an extrusion exit for the molten resin, and a fixed mandrel 3 located within the tubular film extruded from the annular slit 2a and supporting the film in the expanded state. A second part of the apparatus comprises, as shown in FIG. 2, a disc 4 for preventing the flexing of film provided along the path of the fabricated film, a fixed mandrel 3' provided ahead of said path, and a rotary mandrel 5. A third part of the apparatus comprises a guide plate 20 for flattening the tubular film F which has passed through the second part, and nip rollers 8 for pulling out the flattened tubular film F. The above description represents an outline of the present invention, and the description of the details will be needed. But before doing so, we will describe the sequence of tubular film formation, because we believe that this will facilitate the understanding of the details. The tubular film F for explanation purposes is under production as is shown in FIG. 1. In a first step, the film emerging from the annular die 2 is in the molten state, and readily inflates to such a size as to circumscribe the fixed mandrel 3. From the annular die to the fixed mandrel 3, the tubular film advances in a straight line and is given no torsion. Rather, it is preferred that the tubular film should be in intimate contact with the fixed mandrel 3. Furthermore, one requirement in the first step is that the tubular film be cooled and solidified as quickly as possible. In the next place suitable torsion is given to the tubular film F between the first and second steps. Specifically, the torsion is given by rotating the mandrel 5 while maintaining the mandrel 3 in the fixed state. Another requirement is that after passage of the fixed mandrel 3 the film is heated to a stretchable temperature, since the film in the vicinity of the fixed mandrel 3 is in the solidified state. By distorting the heated tubular film in a specified direction while stretching it, it is possible to orient the film in an oblique direction. Since it is desirable that the tubular film F after passage of the second step be in the distorted state, the guide plate 20 and the nip rollers 8 be rotated synchronously and concentrically with the rotary mandrel 5. After going through the above course, a tubular film F oriented in an oblique direction can be obtained.

Additional auxiliary members participate in the above process, and they will be described below.

As shown in the drawings, an air box 9 having a ring-like slit 9a is provided near the annular die 2 along its outer circumference. Air jetted out from the slit 9a is blown against the peripheral surface of the conical film which has been extruded from slit 2a of the annular die 2 to cool the film. An elongated pipe 41 opens into the space surrounded by the tubular film between the annular die 2 and the fixed mandrel 3. Slit 3a is provided in the fixed mandrel 3, and communicates with a vacuum source. Accordingly, the tubular film F is in intimate contact with the periphery of the fixed mandrel 3 so that the torsion of the tubular film located between the fixed mandrel 3 and the rotary mandrel 5 does not spread to the film before the fixed mandrel 3. This intimate contact results in retarding the advancing speed of the tubular film F, but makes it easy to stretch the film in the subsequent step. In the vicinity of the lower end of the fixed mandrel 3, the tubular film F is at a temperature below its melting point, and gradually solidified.

The most critical feature of the present invention is that molecular orientation is imparted to the tubular film F between the fixed mandrel 3 and the rotary mandrel 5.

A suitable heater 10 is provided externally of the tubular film F in order to heat the tubular film F that has left the fixed mandrel 3 to the stretching temperature. When torsion is given to the tubular film F, the film is preferably of exact cylindrical shape. For this purpose, a flex preventing disc 4 and a fixed mandrel 3' are provided. A slit 5a is formed between the fixed mandrel 3' and the rotary mandrel 5, communicating with the vacuum source. Accordingly, the tubular film F can make an intimate contact with the rotary mandrel 5. The tubular film F is maintained in intimate contact with the mandrel 3 and the mandrel 5, and retains its cylindrical shape by contact with the disc 4 and the fixed mandrel 3'. In this state, the rotary mandrel 5 and the nip rollers 8 are continuously rotated synchronously and concentrically, whereupon the tubular film F is stretched in an oblique direction at a certain angle while being distorted in the circumferential direction between the fixed mandrel 3 and the rotary mandrel 5 and can be obliquely oriented.

In this operation, the distance between the fixed mandrel 3 and the rotary mandrel 5 is rendered relatively large. This is one feature of the present invention. The tubular film which has left the first step is cooled and solidified as mentioned above. It is re-heated for a certain period of time to the stretch temperature by means of a suitable heat source. In order to give a heat source of large area and sufficient heating time, the distance between the fixed and rotary mandrels is enlarged. As a result of the larger distance, a larger region of the tubular film is distorted and flexing is likely to occur. In order to prevent this, the flex preventing disc 4 and the fixed mandrel 3' are provided. There is an increasing necessity for these devices with a higher speed of the tubular film. At this time, the fixed mandrel 3' is preferably cooled.

A rotary shaft 21 fixed to the mandrel 5 extends along the center line of the mandrel, and a gear or sprocket 22 is provided beneath it. A chain 18 meshes with the sprocket 22. By driving the chain 18, the rotary mandrel 5 can be rotated.

On the mandrel 5 is disposed a coater 6 for applying an adhesive for use in the preparation of a laminate film. The adhesive coater 6 is adapted to apply an adhesive from a slit 6a. A coater of the spray type can also be employed. The laminate film so obtained is the most useful product obtainable by the present invention.

Since this laminate film is of a two-layered structure as a result of flattening a tubular film which has been obliquely oriented (helically oriented), the oblique orientations of the upper and lower films intersect each other in the superposed state, and therefore, the film exhibits similar mechanical properties to those of a biaxially oriented film.

Accordingly, if the upper and lower films are superposed so that their oblique orientations intersect each other at right angles, the resulting laminate film possesses balanced mechanical strength characteristics, especially tensile and tear strengths, in the longitudinal and transverse directions, and proves very useful as a tough packaging film. This coater 6 can be omitted where a laminate film is not desired.

An elongated pipe 7 for blowing air into the tubular film is provided between the rotary mandrel 5 and the nip rollers 8, and an elongated pipe 43 is provided between the fixed mandrel 3 and the flex preventing plate 4. Air jetted out from the air introduction pipes 7, 41 and 43 flows at different rates. The air is neither heated nor cooled.

Conduits 16 and 17 in FIG. 1 are an inlet and an outlet through which water for cooling the fixed mandrel 3 passes, and conduits 12 and 14 are pipes connected to the vacuum source. Conduits 13 and 14 are air inlet pipes.

As previously stated, the nip rollers 8 pull out the film F in the flattened state, and rotate synchronously and concentrically with the rotary mandrel 5. As shown in FIG. 1, the nip rollers 8 are disposed on a rotary stand 29 which is supported on a plurality of posts 23 (four posts in the drawings). The mandrels described above are located at the center of the space surrounded by the posts. The nip rollers 8 rotate by motor $M_3$ provided on the rotary stand 29. The ring-like guide rail 28 is supported on the tops of the posts, and the rotary stand 29 is rotatably supported on the guide rail 28. The rotary stand 29 is rotated by motor $M_2$, and the rotating force of motor $M_2$ is transmitted to the drive chain 33 through gear devices 30, 31 and 32. The chain 33 meshes with a sprocket 34 formed in a hub 35 extending from the rotary stand 29. Accordingly by actuating motor $M_2$, the rotary stand 29 rotates synchronously and concentrically with the rotary mandrel 5.

A device for adjusting the vertical movement of the rotary stand 29, namely, the vertical position of the nip rollers 8, is also provided. A screw rod 24 is screwed in each of the posts 23, and a bevel gear 25 is provided in each of the posts 23. A bevel gear 26 provided in an output shaft of motor $M_1$ meshes with the bevel gear 25. The bevel gear 25 in each of the posts is rotated synchronously by a connecting rod 27 having a bevel gear at both ends. By the rotation of motor $M_1$, all the screw rods 24 make a vertical movement synchronously. Thus, the vertical position of the rotary stand 29 can be controlled.

We claim:

1. An apparatus for producing a tubular film which comprises: an extruder and an annular die for extruding a tubular film of a thermoplastic resin; means located adjacent said die for cooling said film; a fixed mandrel mounted above said die coaxially therewith and including a slit on its peripheral surface for sucking said film to secure it firmly to said fixed mandrel; a rotating mandrel mounted above said fixed mandrel coaxially therewith and including a slit on its peripheral surface for sucking said film to secure it firmly to said rotating mandrel, said rotating mandrel being capable of imparting torsion to said film between it and said fixed mandrel thereby to orient said film obliquely; a heating zone located between said fixed mandrel and said rotating mandrel; heating means located exteriorly between said fixed and rotating mandrels for heating the tubular film in said heating zone to its orientation temperature; and a pair of nip rollers mounted above said rotating mandrel for pulling out the oriented film, said nip rollers being capable of rotating synchronously and concentrically with said rotating mandrel.

2. The apparatus of claim 1 wherein a flex preventing disc and another fixed mandrel is provided between the fixed and rotating mandrels.

* * * * *